United States Patent [19]
Kim et al.

[11] Patent Number: 4,992,325
[45] Date of Patent: Feb. 12, 1991

[54] INORGANIC WHISKER CONTAINING IMPACT ENHANCED PREPREGS AND FORMULATIONS

[75] Inventors: Yang S. Kim, Seoul, Rep. of Korea; Paul A. Steiner, Concord, Calif.

[73] Assignee: The Dexter Corporation, Pittsburg, Calif.

[21] Appl. No.: 132,286

[22] Filed: Dec. 15, 1987

[51] Int. Cl.$^5$ .................. B32B 5/16; B32B 5/26; B32B 5/28; B32B 5/30
[52] U.S. Cl. .................. 428/241; 428/242; 428/244; 428/283; 428/286; 428/288; 428/290; 428/294; 428/297; 428/302; 428/325; 428/327; 428/331; 428/408; 428/542.8; 428/902
[58] Field of Search .............. 428/294, 302, 297, 408, 428/902, 241, 242, 244, 283, 286, 288, 290, 325, 327, 331, 542.8

[56] References Cited

U.S. PATENT DOCUMENTS

| 4,560,603 | 12/1985 | Giacomel | 428/294 |
| 4,579,885 | 4/1986 | Domlier et al. | 428/413 |
| 4,604,319 | 8/1986 | Evans et al. | 428/290 |
| 4,690,860 | 9/1987 | Radvan et al. | 428/283 |
| 4,713,283 | 12/1987 | Cogswell et al. | 428/241 |
| 4,778,716 | 10/1988 | Thorfinnson et al. | 428/286 |

FOREIGN PATENT DOCUMENTS 268441 11/1986 Japan.

Primary Examiner—James C. Cannon
Attorney, Agent, or Firm—George A. Skoler

[57] ABSTRACT

A prepeg formulation comprising prepreg filament fibers unidirectionally aligned, and/or woven and nonwoven fabrics, a thermosetting matrix resin and a small amount of well dispersed inorganic whiskers in the resin, alone or in combination with extremely fine fibers of a thermoformable polymer having at least one of a $T_m$ or $T_g$ greater than about 300° C. or no $T_m$ or $T_g$ and a decomposition temperature greater than about 300° C. The preferred matrix resin is a blend of a thermosetting epoxy resin and an amorphous thermoplastic polymer having a $T_g$ greater than about 195° C.

16 Claims, No Drawings

INORGANIC WHISKER CONTAINING IMPACT ENHANCED PREPREGS AND FORMULATIONS

BRIEF DESCRIPTION OF THE INVENTION

A prepreg formulation comprising prepreg filament fibers unidirectionally aligned, and/or woven and nonwoven fabrics, and a thermosetting matrix resin and a small amount of inorganic whiskers, alone or in combination with a thin surface layer of extremely fine fibers, particles or fibrids of a thermoformable polymer having at least one of a $T_m$ or $T_g$ greater than about 300° C. or no $T_m$ or $T_g$ and a decomposition temperature greater than about 300° C. The preferred matrix resin is a blend of a thermosetting epoxy resin and an amorphous thermoplastic polymer having a $T_g$ greater than about 195° C.

BACKGROUND TO THE INVENTION

The art of making prepregs is extremely well known. Prepregs typically comprises fabrics (woven and/or nonwoven) and/or continuous filaments of high performance materials such as those having a melting point ($T_m$) or glass transition temperature ($T_g$) of at least about 130° C. Suitable filaments include, by way of example, glass filaments, carbon and graphite filaments, aromatic polyamides (polyphenyleneterephthalamide) such as Kevlar ®, metal fibers such as aluminum, steel and tungsten, boron fibers, and the like.

The filaments are typically bundled into tows and the tows are assembled and spread out into a relatively thin sheet which is either coated or impregnated by the matrix resin. The matrix resin is the typical high performance thermosetting or thermosettable resins. The combination of the filament and the resin results in a prepreg suitable for forming an advanced composite structure. The resin may be any of those thermosetting or thermosettable resins employed in the manufacture of advanced composites. The most common class of resins are the epoxy resins. They are frequently based, inter alia, on one or more of diglycidyl ethers of bisphenol A (2,2-bis(4-hydroxyphenyl)propane) or sym-tris(4-hydroxyphenyl)propane, tris(4-hydroxyphenyl)methane, their polyepoxide condensation products, cycloaliphatic epoxides, epoxy-modified novolacs (phenolformaldehyde resins) and the epoxides derived from the reaction of epichlorohydrin with analine, o-, m- or p-aminophenol, and methylene dianaline. Illustrative resins are epoxies curing at 350° F. (177° C.) and 250° F. (121° C.). Other thermosetting or thermosettable resins include the bismaleimide (BMI), phenolic, polyester (especially the unsaturated polyester resins typically used in SMC production), PMR-15 polyimide and acetylene terminated resins have been found suitable.

There has been a need to make epoxy composites tougher. This point is addressed by Chu, et al. U.S. Pat. No. 4,656,208, patented Apr. 7, 1987, and, in part, by Jabloner, et al., U.S. Pat. No. 4,656,207, patented Apr. 7, 1987, in the following manner:

"One approach in making epoxy composites tougher has been to introduce functionally terminated rubbery polymers into the epoxy resin formulations. The thermosets resulting from these formulations, while having increased toughness, have reduced modulus.

"Another approach has been to incorporate engineering thermoplastics into the epoxy resin formulation. Various thermoplastics have been suggested and the use of polyethersulfone as the thermoplastic modifier for epoxy resin formulations was studied by C. B. Bucknall et al and is discussed in the British Polymer Journal, Vol. 15, March 1983 at pages 71 to 75. Bucknall et al's studies were carried out on cured epoxy-polyethersulfone blends prepared from trifunctional and/or tetrafunctional aromatic epoxides, diaminodiphenylsulfone or dicyandiamide hardener and various amounts of Victrex 100P manufactured by ICI Lt., said to be a relatively low molecular weight grade of polyethersulfone. The studies showed that phase separation occurred in certain of the cured epoxy-polyethersulfone blends and that some of the cured blends exhibited distinct nodular morphological features. Analyses indicated that the polyethersulfone was concentrated in the nodules and Bucknall et al surmised that the nodules were not formed by polyethersulfone alone but by a crosslinked epoxypolyethersulfone copolymer. Bucknall et al found no clear correlation between composition and mechanical properties such as elastic modulus, fracture toughness and creep of the cured blends and concluded that the addition of the polyethersulfone had little effect on the fracture toughness of the resin mixture, irrespective of the degree of phase separation or the morphology.

"Yet another approach for improving the mechanical properties of cured epoxy resins is described in U.S. Pat. No. 4,330,659 to King et al. King et al disclose using as the hardener for epoxy resins the reaction product of diaminodiphenylsulfone with diglycidyl ethers of polyhydric phenols. The cured resins prepared from mixtures of a 'modified' hardener obtained by adducting the coreaction product of the diglycidyl ether of bisphenol A and additional bisphenol A with diaminodiphenylsulfone, and tetraglycidylated methylenedianiline are reported to have increased impact strength and toughness as compared with the cured resins obtained using unmodified diaminodiphenylsulfone as the hardener."

The Chu, et al. and Jobloner, et al. patents purport to differentiate by using as an amine hardener, an amine end-blocked oligomer of the conventional bis-A based polysulfone. The oligomer is characterized as having a number average molecular weight of between about 2,000 and about 10,000.

Diamant, et al., *Development Of Resins For Damage Tolerant Composites—A Systematic Approach*, 29th National SAMPE Symposium, Apr. 3–5, 1984, pages 422–436, disclose the use in composite formulations of blends of TGMDA/DDS[1] epoxy resins and such thermoplastics as the polyethersulfones ("PES") and polyetherimides (PEI) of the repeating unit formulae:

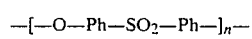

and

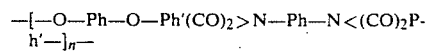

wherein Ph is 1,4-phenylene, Ph' is phenylene in which the carbonyls (CO) are carbon bonded to ring carbons thereof that are ortho as to each other and each ether oxygen (O) is bonded to a ring carbon thereof that is para to one of the ring carbons to which is bonded one of the carbonyls, n has a value sufficient to provide a reduced viscosity of at least about 0.4, as prepreg matrix resins. The polyethersulfone is available as Victrex ® PES from ICI Advanced Materials, Wilmington, Del. 19897, and the polyetherimide is available as Ultem ® from General Electric Company, Company, Plastics Business Group, Pittsfield, Mass. According to Diamant, et al., the thermoplastic polymers make the resin more toughenable.

1. "TGMDA" is the abbreviation for tetraglycidyl methylene dianiline or bis(N,N-diglycidyl-4-aminophenyl)methane and "DDS" is the abbreviation for bis(4-aminophenyl)sulfone.

Leslie, et al., *Chemtech*, July 1975, pages 426–432, describe the combination of epoxy resins and PES for upgrading the temperature performance characteristics of epoxy resin adhesives.

St. Clair, et al., U.S. Pat. No. 4,510,277, disclose the use of Cr(AcAc)$_3$, i.e., tris-(acetylacetonato)chromium (III), in amounts ranging from 1–13% by weight, as additives to TGMDA/DDS resin systems and to DGEBA (bis-2,2-(4-glycidylphenyl)propane and condensation products thereof), for the purpose of improving the moisture resistance of the systems.

A silica ceramic whisker called Xevex TM, sold by J. M. Huber Corporation, Borger, Tex. 79008, has been recommended as a reinforcing fiber for epoxy resins. The amounts recommended in epoxy resins are at conventional filler loading levels of about 40–50 part per hundred parts of the resin.

It has been determined that a layered prepreg formulation comprising continuous filament fibers such as carbon and/or graphite fibers arranged in the form of a prepreg structure, and/or a fabric of the same fibers (woven and/or nonwoven), and impregnated with a matrix resin containing an epoxy resin and an engineering thermoplastic polymer can be provided with capacity to produce laminated structures having enhanced compressive strength properties by incorporating throughout the resin matrix a small amount of inorganic whiskers, and optionally providing at the surfaces of the prepreg a thin layer, less than about 80 microns in thickness, of small fibers, fibrids or particles made of polymers having at least one of a $T_m$ or $T_g$ greater than about 300° C. The invention does not depend on the method for making the prepreg. Many different kinds of prepregs may be employed without deviating from the invention. The invention encompasses also articles and compositions which provide for an enhanced toughened laminate structures and laminate structures with enhanced compressive strength.

THE INVENTION

The invention relates to a prepreg formulation comprising prepreg filament fibers unidirectionally aligned, and/or woven and nonwoven fabrics, a thermosetting matrix resin and a small amount of inorganic whiskers, alone or in combination with extremely fine fibers of a thermoformable polymer having at least one of a $T_m$ or $T_g$ greater than about 300° C. or no $T_m$ or $T_g$ and a decomposition temperature greater than about 300° C. The preferred matrix resin is a blend of a thermosetting epoxy resin and an amorphous thermoplastic polymer having a $T_g$ greater than about 195° C.

The invention relates to a prepreg formulation comprising prepreg filament fibers unidirectionally aligned, and/or woven and nonwoven fabrics, a thermosetting matrix resin of a mixed resin and a small amount of ceramic whiskers, alone or in combination with extremely fine fibers, fibrids or particles of a thermoformable polymer having at least one of a $T_m$ or $T_g$ greater than about 300° C. or no $T_m$ or $T_g$ and a decomposition temperature greater than about 300° C. The preferred matrix resin is a blend of a thermosetting epoxy resin and an amorphous thermoplastic polymer having a $T_g$ greater than about 195° C.

The invention relates also to laminates formed of prepreg formulations comprising prepreg filament fibers unidirectionally aligned, and/or woven and nonwoven fabrics, a thermosetting matrix resin and a small a small amount of uniformly dispersed inorganic, particularly ceramic, whiskers alone or in combination with thin layers of extremely fine fibers, fibrids or particles of a thermoformable polymer having at least one of a $T_m$ or $T_g$ greater than about 300° C. or no $T_m$ or $T_g$ and a decomposition temperature greater than about 300° C. The preferred matrix resin is a blend of a thermosetting epoxy resin and an amorphous thermoplastic polymer having a $T_g$ greater than about 195° C.

The invention relates also to the use of matrix resins as aforedefined wherein there is provided a small amount of a chromium (III) complex.

The invention relates to a matrix resin composition comprising a thermosetting matrix resin of a mixed resin and a small concentration of inorganic (preferably ceramic) whiskers. The preferred matrix resin is a blend of a thermosetting epoxy resin and an amorphous thermoplastic polymer having a $T_g$ greater than about 195° C. Also preferred is a matrix resin composition as aforedefined containing, inter alia, a small amount of extremely fine fibers, fibrids or particles of a thermoformable polymer having at least one of a $T_m$ or $T_g$ greater than about 300° C. or no $T_m$ or $T_g$ and a decomposition temperature greater than about 300° C. Also, is a matrix resin as aforedefined, with inorganic (preferably ceramic) whiskers, provided with a small amount of a chromium (III) complex.

DETAILS OF THE INVENTION

In one embodiment, the invention is directed to a matrix resin system comprising
a thermosetting matrix resin of a mixed resin and,
a small concentration of inorganic (preferably ceramic) whiskers,
which optionally contains one or more of
a small quantity of extremely fine fibers, fibrids or particles of a thermoformable polymer having at least one of a $T_m$ or $T_g$ greater than about 300° C. or no $T_m$ or $T_g$ and a decomposition temperature greater than about 300° C. and,
a small amount of a chromium (III) complex.

In another embodiment, the invention is directed to a prepreg formulation comprising
prepreg filament fibers unidirectionally aligned,
a thermosetting matrix resin of a mixed resin and,
a small concentration throughout the matrix resin of inorganic (preferably ceramic) whiskers,
which optionally contains one or more of
thin surface layers of extremely fine fibers, fibrids or particles of a thermoformable polymer having at least one of a $T_m$ or $T_g$ greater than about 300° C. or no $T_m$ or $T_g$ and a decomposition temperature greater than about 300° C. and a small amount of a chromium (III) complex in the matrix resin.

In a preferred form, the prepreg formulation comprises prepreg filament fibers unidirectionally aligned, a thermosetting matrix resin of a mixed resin comprising, a blend of a thermosetting epoxy resin and an amorphous thermoplastic polymer having a $T_g$ greater than about 195° C., and, a small concentration in the matrix resin of inorganic (preferably ceramic) whiskers, which optionally contains one or more of thin surface layers of extremely fine fibers, fibrids or particles of a thermoformable polymer having at least one of a $T_m$ or $T_g$ greater than about 300° C. or no $T_m$ or $T_g$ and a decomposition temperature greater than about 300° C. and, a small amount of a chromium (III) complex in the matrix resin.

In a further embodiment, the invention comprises laminates formed of a plurality of layers of a prepreg formulation comprising prepreg filament fibers unidirectionally aligned, a thermosetting matrix resin, desirably, a thermosetting matrix resin of a mixed resin and preferably, a blend of a thermosetting epoxy resin and an amorphous thermoplastic polymer having a $T_g$ greater than about 195° C., and, a small concentration in the matrix resin of the prepreg of inorganic (preferably ceramic) whiskers, which optionally contains one or more of thin surface layers of extremely fine fibers, fibrids or particles of a thermoformable polymer having at least one of a $T_m$ or $T_g$ greater than about 300° C. or no $T_m$ or $T_g$ and a decomposition temperature greater than about 300° C. and, a small amount of a chromium (III) complex in the matrix resin.

The invention relates to a toughened resin system with enhanced compressive strength that translates in the ultimate utility to a toughened laminated structure that possesses improved compressive properties. The invention combines the benefits of a thermoplastic additive to an epoxy resin system and provides the presence of inorganic (preferably ceramic) whiskers, alone or in combination with thermoplastic organic fibers, particles and/or fibrids in the resin system whereby a resulting prepreg contains the whiskers throughout the matrix resin and the thermoplastic organic fibers, particles and/or fibrids located at at least one of its surfaces, and a laminate resulting from multi-plies of the prepregs possesses such whiskers, alone or combined with the thermoplastic organic fibers, particles and/or fibrids, where the former are throughout the resin matrix component and the latter are in the laminate at the ply interfacings of the prepregs making up the laminate.

The inorganic (preferably ceramic) whiskers serve the function of counteracting the loss in compressive properties caused by the inclusion of the amorphous thermoplastic polymer and the extremely fine fibers, fibrids or particles in the resin composition of the invention. The loss in compressive properties is particularly noted when the specimen being tested is first saturated with moisture and then tested hot, from about 80° C. to about 220° C. The loss in properties is caused by the loss in resin modulus with the addition of the lower modulus amorphous thermoplastic polymer. The whiskers raise the resin modulus without significantly affecting the toughness of the resin resulting in a composite that is tough while possessing essentially the original compression strength of the epoxy resin.

The epoxy resins suitable in the practice of the invention include the various established thermosetting epoxy resins conventionally employed in making prepregs, especially carbon and graphite fiber reinforced prepregs. It is desirable that the epoxy resin be a low or lower viscosity version to facilitate prepreg formation. Illustrations of suitable epoxy resin include, e.g., one or more of diglycidyl ethers of bisphenol A (2,2-bis(4-hydroxyphenyl)propane) or sym-tris(4-hydroxyphenyl)propane or tris(4-hydroxyphenyl)methane, their polyepoxide condensation products, cycloaliphatic epoxides, epoxy-modified novolacs (phenolformaldehyde resins) of the formula:

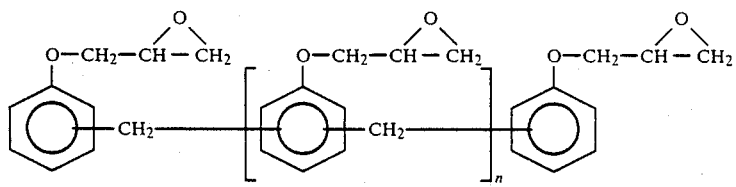

wherein n is 0.2–1.8, preferably 0.2, and the epoxides derived from the reaction of epichlorohydrin with analine, o-, m- or p-aminophenol, and methylene dianaline. Particularly illustrative of suitable epoxy resins are the low viscosity epoxy resins such as bis(N,N-diglycidyl-4-aminophenyl)methane, bis-2,2-(4-glycidyloxyphenyl)propane and condensation products thereof, sym-tris(4-glycidyloxyphenyl)propane, and 4-glycidyloxy-N,N-diglycidyl-phenylamine, and the like. Other epoxy resins may be combined with the above epoxy resins or used alone. They include, e.g., 3,4-epoxycyclohexylmethyl-3,4-epoxycyclohexane carboxylate, vinyl cyclohexene dioxide, 2-(3,4-epoxycyclohexyl-5,5-spiro-3,4-epoxy)cyclohexane-meta-dioxane, bis(3,4-epoxycyclohexyl)adipate, and the like.

The epoxy resins of the invention are combined with hardeners which cure the resin to a thermoset condition. The preferred hardeners are amine compounds, ranging from dicyandiamide to the more desirable aromatic amines. A particularly preferred class of hardeners are the aromatic amines encompassed by the formula:

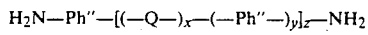

wherein Ph" is ortho, meta or para phenylene, Q is one or more of a divalent group such as $-SO_2-$, $-O-$, $-RR'C-$, $-NH-$, $-CO-$, $-CONH-$, $-OCONH-$, and the like, R and R' may each independently be one or more of hydrogen, phenyl, alkyl of 1 to about 4 carbon atoms, alkenyl of 2 to about 4 carbon atoms, fluorine, cycloalkyl of 3 to about 8 carbon atoms, and the like, x may be 0 or 1, y may be 0 or 1 and is 1 when x is 1, and z may be 0 or a positive integer, typically not greater than about 5.

Particularly preferred hardeners are diamines of the formula:

$H_2N-Ph-NH_2$ $H_2N-Ph-SO_2-Ph-NH_2$ $H_2N-Ph-CO-Ph-NH_2$ $H_2N-Ph-O-Ph-NH_2$ $H_2N-Ph-(CH_3)_2C-Ph-NH_2$ $H_2N-Ph-(CH_3)_2C-Ph-(CH_3)_2C-Ph-NH_2$ $H_2N-Ph-(CH_3)_2C-Ph-SO_2-Ph-(CH_3)_2C-Ph-NH_2$ $H_2N-Ph-(CH_3)_2C-Ph-O-Ph-(CH_3)_2C-Ph-NH_2$ wherein Ph is as defined above. Each of the above Ph may be instead ortho or meta phenylene.

Another class of hardener are the aliphatic amines such as the alkyleneamine. Illustrative of suitable alkyleneamines are the following:
monoethanolamine
ethylenediamine
N-(2-aminoethyl)ethanolamine
Diethylenetriamine
N-(2-aminoethyl)piperazine
Triethylenetetramine
Tetraethylenepentamine
Pentaethylenehexamine
Diaminoethylpiperazine
Piperazinoethylethylenediamine
4-Aminoethyltriethylenetetramine
Tetraethylenepentamine
Aminoethylpiperazinoethylethylenediamine
Piperazinoethyldiethylenetriamine The hardener may be a monoamine such as aniline, paraaminophenol, and alkylated versions of them.

The amount of the hardener employed is usually stoichiometrically equivalent on the basis of one amine group per epoxy group in the resin. If the epoxide is a triepoxide and the hardener is a diamine, then the molar ratio of hardener to epoxide would typically be about 2.5/3 or 0.83. A typical formulation would have a weight ratio of epoxy resin to hardener of about 3/2 to about 4/1.

The inorganic (preferably ceramic) whiskers are provided in the resin system whereby a resulting prepreg contains the same located throughout the resin and a laminate resulting from multi-plies of the prepregs possesses such inorganic (preferably ceramic) whiskers in the laminate between the fibers of the prepregs making up the laminate. The typical whisker has an aspect ratio (l/d) greater than 1, preferably greater than about 10 up to about 60, and a diameter less than about 3 microns. Such whiskers have been recommended in the past as reinforcing fibers in epoxy resins at conventional filler loading levels of about 40-50 part per hundred parts of the resin. In the practice of this invention, the whiskers are utilized in much smaller amounts. Broadly, the amount of whiskers utilized in making the formulations of the invention may be as low as 0.5 to as much as 5 weight % based on the weight of the combination of the epoxy resin, the hardener, the extremely fine fibers, fibrids or particles and the whiskers. In the preferred embodiment, the amount of whiskers employed ranges from about 0.8 to about 2.2 weight %, same basis.

A variety of whiskers are employable. They include carbon whiskers, silicon carbide whiskers, silicon nitride whiskers, and ceramic whiskers. The preferred whiskers are the ceramic variety. A particularly desirable ceramic whisker is the cobweb type made primarily of amorphous silicon dioxide and crystalline elemental silicon. They have surface areas (BET) of about 35–50 m²/g. A preferred ceramic whisker for use herein is a product called Xevex ™, sold by J. M. Huber Corporation, Borger, Tex. 79008.

The thin prepreg surface layers of extremely fine fibers, fibrids or particles of a thermoformable polymer having at least one of a $T_m$ or $T_g$ greater than about 300° C. or no $T_m$ or $T_g$ and a decomposition temperature greater than about 300° C. are derivable from a variety of polymers. One class of polymers suitable for this aspect of the invention are the polyetherketone containing the structural combinations embraced by the empirical formula:

$$-(-Ph-O-)_a-(-Ph-CO-)_b-(-Ph-)_c-$$

wherein the polymer contains only Ph, as defined above, oxygen, carbonyl, and optionally, sulfonyl (SO₂) and each oxygen, cabonyl and sulfonyl is separated from each other by at least one Ph, and the ratio of a to b is about 0.5 to about 3, and the value of c is at least sufficient to satisfy the requirement of separating the oxygen, carbonyl, and the optional sulfonyl (SO₂). When the value of c is greater than the above requirement, then Ph is directly bonded to Ph. Illustrations of such polyetherketones can be found in U.S. Pat. No. 4,320,224, patented Mar. 16, 1982, European Patent No. 0 001 879, published Mar. 24, 1982, U.S. Pat. No. 3,953,400, patented Apr. 27, 1976, Dahl U.S. Pat. No. 3,956,240, patented May 11, 1976, and U.K. Patent Application No. 2 102 420 A or European Patent Application No. 0 069 598, both filed Jul. 7, 1982, and both based on U.S. patent application Ser. No. 281,526, filed Jul. 8, 1981, and now abandoned. Commercial polyether ketone polymers are Stilan ™ (made by Raychem Company) having the repeating unit structure —Ph—O—Ph—CO—("PEK") and Victrex ™ PEEK (made by Imperial Chemicals Industries PLC ("ICI")) ("PEEK"). Preferably these polyetherketones have an inherent viscosity of at least 0.7, measured at 25 C. on a solution of the polymer in concentrated sulphuric acid of density 1.84 g.cm⁻³, the solution containing 0.1 g. of polymer/100 cm³ of solution.

Another thermoformable polymer having at least one of a $T_m$ or $T_g$ greater than about 300° C. or no $T_m$ or $T_g$ and a decomposition temperature greater than about 300° C. is poly-2,2′-(m-phenylene) -5,5′-bibenzimidazole. This polymer has a decomposition temperature greater than 450° C. and is sold by Hoescht-Celanese Corporation, Charlotte, N.C. 28232 under the name PBI ™ Polybenzimidazole Polymer.

The extremely fine fibers are relatively short cut fibers having a length ranging from about 0.1 to about 2.0 millimeters, preferably from about 0.1 to about 1.2 millimeters. They typically have a diameter ranging from about 0.002 to about 0.05 millimeters, preferably from about 0.002 to about 0.015 millimeters.

The fibrids are also short fibers having a length ranging from about 0.1 to about 1.5 millimeters, preferably from about 0.1 to about 1.2 millimeters. They typically have a diameter ranging from about 0.002 to about 0.015 millimeters, preferably from about 0.002 to about 0.01 millimeters.

The particles may assume a variety of shapes short of the shape of a fiber. They may be spherical, irregular, platelet-like, and the like shapes. On the whole, they have small cross-sectional areas, typically less than a sphere having a diameter less than about 50 microns.

The amount of the fine fiber provided in the resin system, exclusive of prepreg fibers, is below the typical amount used for reinforcement of the resin. That amount may be as low as about 0.25 to about 5 weight %, based on the weight of the epoxy resin, the hardener, the amorphous thermoplastic polymer, and any other soluble additive such as the chromium complex.

The preferred matrix resin is a blend of a thermosetting epoxy resin and an amorphous thermoplastic polymer that has a $T_g$ greater than about 195° C. Suitable amorphous thermoplastic polymers are engineering or performance polymers. The preferred amorphous thermoplastic polymers are the polyarylethers having a reduced viscosity sufficiently high to make them tough, that is, they form tough films. Generally, that means the polymers have a reduced viscosity of at least 0.4. Illustrative of such polyaryl ethers are the various polymers depicted in Johnson and Farnham, U.S. Pat. No. 4,108,837, patented Aug. 22, 1978, and U.S. Pat. No. 4,175,175, patented Nov. 20, 1979, and includes the polyethersulfones ("PES") and polyetherimides (PEI) of the repeating formulae:

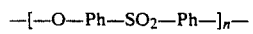

—[—O—Ph—SO$_2$—Ph—]$_n$— and

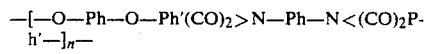

—[—O—Ph—O—Ph'(CO)$_2$>N—Ph—N<(CO)$_2$Ph'—]$_n$— and the polyarylsulfones of the repeating formulae:

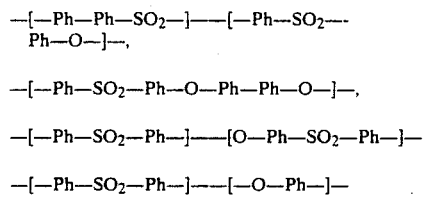

—[—Ph—Ph—SO$_2$—]——[—Ph—SO$_2$—Ph—O—]—,

—[—Ph—SO$_2$—Ph—O—Ph—Ph—O—]—,

—[—Ph—SO$_2$—Ph—]——[O—Ph—SO$_2$—Ph—]—

—[—Ph—SO$_2$—Ph—]——[—O—Ph—]— wherein Ph is 1,4-phenylene, Ph' is phenylene in which the carbonyls (CO) are carbon bonded to ring carbons thereof that are ortho as to each other and each ether oxygen (O) is bonded to a ring carbon thereof that is para to one of the ring carbons to which is bonded one of the carbonyls, n has a value sufficient to provide a reduced viscosity of at least about 0.4, as prepreg matrix resins. The polyethersulfone and the polyarylsulfone of the formula —[—Ph—Ph—SO$_2$—]——[—Ph—SO$_2$—Ph—O—]— are available as Victrex® PES and 720P, respectively, from ICI Advanced Materials, Wilmington, DE 19897, and the polyetherimide is available as Ultem® from General Electric Company Company, Plastics Business Group, Pittsfield, Mass. The remaining polyarylsulfones are available from Amoco Performance Products, Inc., Ridgefield, Conn. under the name Radel® R and A-400.

The amount of the amorphous thermoplastic polymer in the resin compositions of the invention is not narrowly critical. The amount may range from as little as 2 weight % to as much as 85 weight % based on the weight of the combination of the epoxy resin, the hardener and the amorphous thermoplastic polymer. Preferably, the amount may range from about 3 to about 80 weight %, same basis, more preferably from about 5 to about 40 weight %, same basis.

The chromium complex suitable in the practice of this invention is a soluble chromium (III) compound which effects a toughening of the resin system employed. The chromium (III) complex may be any coordination compound of chromium (III), preferably a compound which is soluble in the resin formulation. The desirable coordination compounds are those in which the ligand is derived from a compound of the formula: RCOR'R"CO, wherein R and R' are each individually alkyl of 1 to 6 carbon atoms, and R" is alkylene of 1 to 6 carbon atoms. The preferred ligand is acetylacetonato ("acac"). The amount of the chromium complex is not narrowly critical to achieve the toughening effect on the resulting composite. A small quantity provides significant improvements in toughening of the resin. A suitable amount may range from as little as 0.01 weight % of the weight of the resin system, basis weight of the epoxy resin, hardener, the amorphous thermoplastic polymer and the complex, to as much as 3.0 weight %, same basis. In the preferred practice of the invention, the complex may be present in amounts ranging from about 0.1 to about 2.0 weight %, same basis. In the most preferred embodiment, the amount of the complex is present in an amount ranging from about 0.2 to about 1.0 weight %, same basis. An optimum amount ranges from about 0.3 to about 0.5 weight %, same basis.

The resin formulations of the invention can contain other ingredients in small amounts. For example, small amounts, typically less than 2 weight percent based on the total formulation can comprise a silane coupling agent such as phenyltrimethoxysilane,
γ-glycidoxypropyltrimethoxysilane,
2-(3,4-epoxycyclohexyl)ethyltrimethoxysilane,
γ-mercaptopropyltrimethoxysilane,
γ-aminopropyltriethoxysilane, and the like.

A variety of reactive diluents may be used to lower the viscosity of the resin system to assist in prepreg impregnation. Illustrative reactive diluents are low molecular weight epoxy resins such as 2-vinyl-vic.-epoxycyclohexane, which typically have a viscosity below 1500 cps. at 23° C.

One may also add small amounts of one or more of other thermoplastic polymer ingredients to help in making the amorphous thermoplastic polymer that has a $T_g$ greater than about 195° C. more compatible to the epoxy resin. For example, one may incorporate up to 5 weight per cent, typically not more than about 3 weight %, based on the weight of the epoxy resin formulation, of a variety of thermoplastics having a $T_g$ less than about 195° C. A preferred thermoplastic is an amorphous polymer and is compatible or miscible with the amorphous thermoplastic polymer that has a $T_g$ greater than about 195° C. Preferred amorphous thermoplastics having a $T_g$ less than about 195° C. are those having a $T_g$ greater than about 135° C. Illustrative of such polymers are those of the formula:

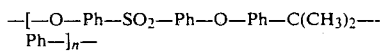

where Ph and n have the meanings set forth above. Such a polysulfone is available from Amoco Performance Products, Inc., Ridgefield, Conn. under the name Udel TM P-1700 polysulfone.

The resin formulation is usually made by mixing the components in a convenient tank and effecting admixture with a conventional mixer, such as a paddle or Cowles TM Dissolver. The order of addition of the ingredients is not normally critical but it is preferred to add the lower viscosity material first followed by the solid materials that require solubilization. Mixing can be effected throughout or at the end of the additions.

Mixing is normally effected at room temperature, about 23° C. Ceramic whiskers are predispersed in the epoxy resin by high shear mixing. Mixing is continued until the resin is homogeneous and the amorphous thermoplastic is in solution. Chromium (III) complex and the particles, fibers or fibrids are added and mixed until uniformly and evenly dispersed. Finally the amine hardener is added and mixing is continued until the composition is uniform in appearance. The rate of solubilization is enhanced by raising the solution temperature.

The epoxy resin formulation containing a thermosetting matrix resin of a mixed resin and a small quantity of inorganic (preferably ceramic) whiskers, and optionally a small amount of extremely fine fibers, fibrids or particles of a thermoformable polymer having at least one of a $T_m$ or $T_g$ greater than about 300° C. or no $T_m$ or $T_g$ and a decomposition temperature greater than about 300° C. and a small amount of a chromium (III) complex, is used to impregnate a layer of continuous filament tow of a high strength filaments such as glass filaments, carbon and graphite filaments, aromatic polyamides (polyphenyleneterephthalamide) such as Kevlar ® filaments, metal fiber filaments such as aluminum, steel and tungsten, boron fiber filaments, and the like.

The resulting fiber reinforced composite typically contains from about 25% to about 75%, preferably from about 35 to about 70%, of the filamentary fibers based on the total volume of the composite. A common resin concentration in the prepreg will be about 28-40 weight % of the weight of the prepreg, the remainder being the weight of the filament fibers.

The preferred method for making the fiber reinforced composite is by hot melt prepregging. This involves impregnating bands or sheets of filamentary tow or fabrics with the epoxy resin formulation of the invention in molten form. The impregnated band (sheet) or fabric is then cooled to a temperature low enough to essentially stop the advancement of the resin by polymerization.

In the course of the impregnation, a significant part of the fine fiber, fibrids or particle are filtered from penetration into the interior of the band or sheet and are thereby located at one or more of the exterior surfaces of the prepreg. These solid components of the formulation can be sprinkled onto the surface(s) of the prepreg rather than be provided with the epoxy resin during impregnation. Such deposition can be effected by other well known methods of depositing small particulate materials onto a solid or liquid surface. Standard electrodeposition techniques such as used in floc fiber deposition or standard air laying techniques for the deposition of fibrous materials represent suitable altermative procedures for depositing these extremely fine filamentary or particulate materials onto the prepreg structure at the surface. The whiskers migrate into the interior of the prepreg with the penetration of the resin due to the whiskers' extremely small size.

In the typical formulation, the epoxy resin will be a mixture of resins chosen on the basis of performance sought for the prepreg. A typical combination is a low viscosity di, tri or tetraglycidyl resin, combined with a higher viscosity resin, such as a cycloaliphatic epoxide and an epoxy novolac resin. Frequently it is desirable to add a small amount of a reactive diluent in order to have a resin formulation that is easily hot meltable for the impregnation step. The most common of the hardeners is DDS, either the all para or all meta variety. As pointed out above, the stoichiometry based on the functionality of the resin and the hardener will determine the amount of each of the components. As a rule, the epoxide(s) and the hardener(s) will generally be employed in the weight ratio of about 7/3.

A convenient resin formulation comprises equal parts by weight of 4-glycidyloxy-N,N-diglycidyl-phenylamine, an epoxy novolac (n=0.2), and polyethersulfone (Victrex PES 5003P). The total resin formulation may contain about 4 parts of a monoepoxy aromatic ether diluent and about 1/5 of its weight of 3,3'-DDS. Another resin formulation may contain essentially equal parts by weight of 4-glycidyloxy-N,N-diglycidylphenylamine and polyethersulfone (Victrex PES 5003P), combined with equal parts of bis(N,N-diglycidyl-4-aminophenyl)methane and the epoxy novolac, in a ratio of 2:1, the same amount of a reactive diluent and the hardener. Each of these formulations may contain about 2.5 weight % of PEEK and/or PBI fine fibers, denier less than 450 and 1.5 weight % of Xevex TM whiskers. To help in the compatibility of the polyethersulfone, one may add a small amount, about 0.5 weight %, of Udel TM P-1700.

The following table in which the epoxy resin is a mixed resin of an epoxy resin and PES polymer, indicates the benefits of the invention:[2]

[2]. Upward arrow means improvement in property in question, a downward arrow means a reduction in the property; the more upward arrows, the greater is the improvement

| PROPERTIES | EPOXY FORMULATION WITHOUT Cr(acac)$_3$ | EPOXY FORMULATION WITH Cr(acac)$_3$ |
|---|---|---|
| G$_{1c}$ IN-LB/IN$^2$ ASTM E-399 (compact tension) | — | ↑ |
| COMPRESSION AFTER IMPACT, Ksi | — | ↑ |
| NEAT RESIN FLEXURES, ULTIMATE STRENGTH, Ksi | — | ↑ |

| PROPERTIES | EPOXY RESIN W/O FIBERS, WHISKERS or Cr(acac)$_3$ | EPOXY RESIN W/PBI FIBERS | EPOXY RESIN W/PEEK FIBERS | EPOXY RESIN W/PBI FIBERS, WHISKERS and Cr(acac)$_3$ |
|---|---|---|---|---|
| COMPRESSION AFTER IMPACT | — | ↑ | ↑ | ↑ |
| COMPRESSION Rm. Temp., Ksi | — | ↑ | ↑↑ | ↑↑↑ |
| COMPRESSION 180° F. | — | ↑↑ | ↑ | ↑↑↑ |
| COMPRESSION WET 180° F.[3] | — | ↓ | ↓ | ↑↑↑ |

[3] Soaked for 14 days in 70° C. water prior to testing.

We claim:

1. A prepreg formulation comprising prepreg fabric and filament fibers unidirectionally aligned, a thermosetting matrix resin of a mixed resin of a thermosetting epoxy resin and an amorphous thermoplastic polymer having a $T_g$ greater than about 195° C., a small amount of inorganic whiskers, from the group of carbon whiskers, silicon carbide whiskers, silicon nitride whiskers, and ceramic whiskers, incorporated throughout the resin matrix and a thin surface layer of extremely fine fibers, fibrids or particles of a thermoformable polymer having at least one of a $T_m$ or $T_g$ greater than about 300° C. or no $T_m$ or $T_g$ and a decomposition temperature greater than about 300° C.

2. The prepreg formulation of claim 1 wherein the amorphous thermoplastic polymer is one or more of a polyethersulfone, a polyarylsulfone and a polyetherimide.

3. The prepreg formulation of claim 1 wherein the amount of whiskers employed ranges from about 0.5 to about 5.0 weight % of the weight of the thermosetting matrix resin.

4. The prepreg formulation of claim 1 wherein the extremely fine fiber is present in an amount of about 0.25 to about 5 weight % based on the weight of the matrix resin.

5. The prepreg formulation of claim 1 wherein there is present a small amount of a chromium (III) complex.

6. The prepreg formulation of claim 1 wherein the epoxy resin comprises a low viscosity glycidyl epoxy resin.

7. The prepreg formulation of claim 2 wherein there is present small amount of a thermoplastic having a $T_g$ less than about 195° C.

8. The prepreg formulation of claim 3 wherein the whiskers are ceramic.

9. A laminate formed of the prepreg formulations of claim 1.

10. A laminate formed of the prepreg formulations of claim 2.

11. A laminate formed of the prepreg formulations of claim 3.

12. A laminate formed of the prepreg formulations of claim 4.

13. A laminate formed of the prepreg formulations of claim 5.

14. A laminate formed of the prepreg formulations of claim 6.

15. A laminate formed of the prepreg formulations of claim 7.

16. A laminate formed of the prepreg formulations of claim 8.

* * * * *